United States Patent [19]

Resan

[11] Patent Number: 4,841,706
[45] Date of Patent: Jun. 27, 1989

[54] NON-PENETRATING FASTENER FOR AFFIXING ELASTOMERIC SHEETING TO A ROOF

[75] Inventor: Stevan A. Resan, Marshall, Va.

[73] Assignee: Carlisle Corporation, Cincinnati, Ohio

[21] Appl. No.: 122,277

[22] Filed: Nov. 18, 1987

[51] Int. Cl.⁴ .............................................. E04B 5/00
[52] U.S. Cl. .................................. 52/410; 24/90 HA; 24/693
[58] Field of Search .............. 52/410, 553; 24/90 HA, 24/90 A, 693

[56] References Cited

U.S. PATENT DOCUMENTS

| | | |
|---|---|---|
| 2,916,399 | 12/1959 | Kurz et al. |
| 3,206,818 | 9/1965 | Knowlton ........................ 24/90 HA |
| 3,671,371 | 6/1972 | Wolf ................................ 52/410 |
| 3,863,659 | 2/1975 | Gillis .............................. 24/90 HA |
| 4,120,712 | 10/1978 | Sindt . |
| 4,162,597 | 7/1979 | Kelly . |
| 4,167,259 | 9/1979 | Bury . |
| 4,221,096 | 9/1980 | Viertlboeck ...................... 52/553 |
| 4,313,777 | 2/1982 | Buckley et al. . |
| 4,382,353 | 5/1983 | Kelly . |
| 4,389,826 | 6/1983 | Kelly . |
| 4,416,713 | 11/1983 | Brooks . |
| 4,478,669 | 10/1984 | Zeller et al. . |
| 4,488,335 | 12/1984 | Fox et al. . |
| 4,489,018 | 12/1984 | Ball . |
| 4,560,579 | 12/1985 | Siadat et al. . |
| 4,571,472 | 2/1986 | Pollack et al. . |
| 4,586,301 | 5/1986 | Hickman ......................... 52/410 |
| 4,630,422 | 12/1986 | Beneze ........................... 52/512 |
| 4,631,887 | 12/1986 | Francovitch ..................... 52/410 |
| 4,649,686 | 3/1987 | Backenstow ..................... 52/410 |
| 4,651,490 | 3/1987 | Marston .......................... 52/410 |

FOREIGN PATENT DOCUMENTS 505396 9/1951 Belgium ........................... 24/90 HA
2121355 12/1983 United Kingdom .

OTHER PUBLICATIONS

Inductron Corporation, "Business Prospectus", pp. 1, 2, 4, 6, 8 and F3.
NASA Langley Research Center, "Hot-Melt Adhesive Attachment System", NASA Tech Briefs, Spring 1963, p. 344.
SAE Technical Paper Series, "Toroid Joining Gun", pp. 1–11.

Primary Examiner—Henry E. Raduazo
Attorney, Agent, or Firm—Wood, Herron & Evans

[57] ABSTRACT

A non-penetrating fastener for mounting elastomeric sheeting to a roof includes a base plate adapted to be fixedly mounted to the roof and having a surface which mounts an induction heating element coated with hot melt adhesive, and a rigid top plate having a surface which mounts a second induction heating element coated with hot melt adhesive. The rigid top plate and base plate are positioned on opposite sides of an elastomeric sheet so that their adhesive coated surfaces of their induction heating elements contact the sheet and the rigid top plate overlies the base plate. In response to bombardment with a magnetic flux from an induction welding device, the induction heating elements of both the base plate and rigid top plate heat the adhesive thereon to the molten state for adhesion to the elastomeric sheet.

9 Claims, 1 Drawing Sheet

NON-PENETRATING FASTENER FOR AFFIXING ELASTOMERIC SHEETING TO A ROOF

FIELD OF THE INVENTION

This invention relates to fasteners, and, more particularly, to a non-penetrating fastener for securing elastomeric sheeting to the roof of a building.

BACKGROUND OF THE INVENTION

Elastomeric sheeting has been employed for many years in roofing applications as an alternative to tar and gravel roofs. Elastomeric sheeting is commercially available in single or multiple plys and is usually supplied in rolls which are unwound atop the roof to form individual, overlapping sheets. In order to secure the individual sheets to the roof, the overlapping edges of adjacent sheets are heat-welded or bonded together with adhesives, and fasteners are placed at intervals along the sheet which are connected to the roof.

One of the major concerns in the installation of elastomeric sheeting is to avoid leakage in the areas of attachment between the sheeting and roof. Nails, screws and similar fasteners which penetrate the elastomeric sheeting and extend into the roof were among the first types of fasteners employed to secure elastomeric sheeting to a roof. Although such fasteners may be effective in maintaining the elastomeric sheeting in place, there is always the danger of leakage at the point where the sheeting is penetrated particularly as the sheeting ages and is exposed to harsh wheather conditions.

Non-penetrating fasteners have been provided in the prior art to affix elastomeric sheeting to roof without the formation of holes or any other punctures therein. One type of non-penetrating fastener generally comprises a base plate fixedly secured to the roof having an upper surface over which the elastomeric sheeting is positioned. The upper surface of the base plate and facing surface of the elastomeric sheeting are then bonded together to affix the sheeting to the roof.

In some fasteners of this general type, as disclosed for example in U.S. Pat. No. 3,671,371, the base plate includes a metal or foil layer which is heated when exposed to a high frequency electric field and welds the upper layer of the base plate to the elastomeric sheeting. Other fastener designs of this type employ an adhesive material, such as hot melt adhesive, which is applied to the upper surface of the base plate and then heated with the elastomeric sheeting in position over the base plate to affect a bond therebetween.

One problem with fasteners relying solely on a weld or bond between the elastomeric sheeting and the upper surface of a base plate is the so-called "peeling" effect produced by the wind. As the wind blows across the elastomeric sheeting, uplift forces are produced which tend to pull or peel the elastomeric sheeting away from the base plate beneath. This is primarily due to the flexibility of the elastomeric sheeting which allows it to bend and flex in response to the uplift forces produced by the wind. Once an edge of the elastomeric sheeting begins to separate from the base plate, additional uplift forces from the wind tend to readily peel the reminder of the elastomeric sheeting away from the base plate resulting in complete failure of the fastener connection.

SUMMARY OF THE INVENTION

It is therefore among the objectives of this invention to provide a non-penetrating fastener which securely mounts sheeting to a roof without leakage and which provides high resistance to uplift forces produced by the wind.

These objectives are accomplished in a non-penetrating fastener which, in its broadest aspect, comprises a base plate having one surface covered with adhesive and a rigid top plate having one surface covered with adhesive. The base plate is permanently affixed to the roof. The plate is positioned atop the base plate with the elastomeric sheeting therebetween so that the surfaces of the base plate and rigid top plate covered with adhesive are in contact with the elastomeric sheeting. The adhesive is then bonded to the sheeting by the application of heat to affix both the bottom plate and rigid top plate thereto. Uplift forces applied to the elastomeric sheeting tending to pull it away from the base plate are resisted by the rigid top plate which is substantially inflexible and does not readily permit the elastomeric sheeting to bend and flex away from the base plate.

In a more specific aspect of this invention, the fastener herein is particularly adapted for use with an inclusion welding device for bonding the elastomeric sheeting thereto. In a presently preferred embodiment, an induction heating element in the form of a sheet of metal foil or metal screen is mechanically affixed to one surface of the base plate. A coating of suitable adhesive such as hot melt adhesive, butyl-based thermoset adhesive, silicon adhesive or the like is then applied to the metal foil or metal screen sheet. Similarly, a metal foil or metal screen sheet is mechanically mounted to a surface of the rigid top plate and a coating of hot melt adhesive is applied thereto. With the elastomeric sheeting positioned between the base plate and rigid top plate, and their induction heating elements coated with adhesive in contact with the elastomeric sheeting, an induction welding device is placed in contact with the rigid top plate. When activated, the induction welding device produces magnetic flux which heats the metal foil or metal wire sheets on both the base plate and rigid top plate. In turn, the adhesive on such elements becomes molten, and, after cooling, bonds the base plate and rigid top plate to the elastomeric sheeting in contact therewith. The materials utilized in the formation of the metal foil and metal screen, as well as their thickness and other dimensions, are chosen to ensure rapid heating of the adhesive to the molten state without damaging the elastomeric sheeting.

In another aspect of this invention, the fastener described above is modified to form the rigid top plate with an outwardly extending lip which mates with the outer edge of the base plate. In this embodiment, the rigid top plate is forced downwardly against the base plate so that the elastomeric sheeting is wedged between the lip of the rigid top plate and the edge of the base plate. The adhesive on the induction heating elements carried by the base plate and rigid top plate is then melted in the same manner described above to affect a bond to the elastomeric sheeting. This arrangement provides additional resistance to uplift forces produced by the wind.

The primary advantage of the fastener of this invention compared to prior art non-penetrating fasteners is that the rigid top plate is substantially inflexible and resists the tendency of the elastomeric sheeting to bend or flex in the area of the base plate in response to uplift forces from the wind. The term "rigid" used in referring to the top plate is meant to describe a structure which resists bending in response to the uplift forces from the wind to a much greater extent than the elastomeric sheeting. This substantially increases the strength of the fastener of this invention as compared to the prior art.

DESCRIPTION OF THE DRAWINGS

The structure, operation and advantages of a presently preferred embodiment of this invention will become further apparent upon consideration of the following description taken in conjunction with the accompanying drawings, wherein.

DETAILED DESCRIPTION OF THE INVENTION

Figure 1:
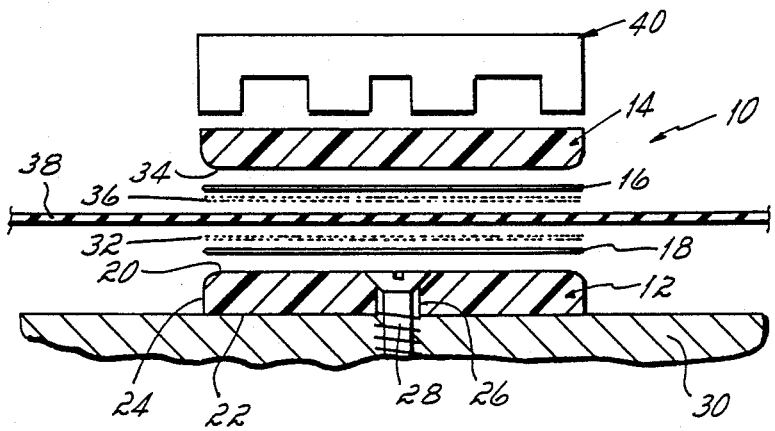
FIG. 1 is an exploded, cross sectional view illustrating one embodiment of the non-penetrating fastener of this invention.

Referring now to FIG. 1, a non-penetrating fastener 10 comprises a base plate 12, a rigid top plate 14 and upper and lower induction heating elements 16, 18. The base plate 12 is preferably annular in shape having an upper surface 20 and a lower surface 22 forming an edge section 24 therebetween. At least one throughbore 26 is formed in the base plate 12 which receives a screw 28 having a tapered end formed to seat within the base plate 12 flush with its upper surface 20. The screw 28 fixedly mounts the base plate 12 to the roof 30 so that the upper surface 20 of base plate 12 is exposed.

In a presently preferred embodiment, the lower induction heating element 18 is mechanically mounted to the upper surface 20 of the base plate 12. Alternatively, heating element 18 can be bonded to the base plate 12 by adhesive or the like. A layer 32 of adhesive, such as hot melt adhesive, butyl-based thermoset adhesive, silicon adhesive or the like, is applied to the exposed surface of the lower heating element 18, which, at ambient temperature, is in solid state.

The top plate 14 is annular-shaped and preferably formed of a substantially inflexible, rigid material such as plastic. The top plate 14 has an exposed surface 34 to which the upper induction heating element 16 is mechanically mounted, or, alternatively, bonded in place. A layer 36 of adhesive is applied to the exposed surface of the upper induction heating element 16 which is in solid state at ambient temperature.

In a presently preferred embodiment, the upper and lower induction heating elements 16, 18 are in the form of a metal foil or a metal wire screen made of low carbon steel 1008, stainless steel 410 or Metglass alloy 2605-52. The metal foil is cut to the shape of the base plate 12 or rigid top plate 14 and has a thickness preferably of about 0.005 inches. The metal screen is preferably a 30 mesh screen with a 0.012 inch wire diameter, a 40 mesh screen with a 0.010 inch wire diameter, or an 80 mesh screen with a 0.005 inch wire diameter. It is contemplated that either the metal foil or metal screen could be used to form the upper and lower induction heating elements 16, 18.

As illustrated in FIG. 1, an elastomeric sheet 38 is placed over the heating element 18 fixed to upper surface 20 of base plate 12, and the rigid top plate 14 with heating element 16 is positioned atop the elastomeric sheet 38 directly above the base plate 12. In this position, the induction heating element 16 fixed to surface 34 of rigid top plate 14, which is coated with the adhesive layer 32, contacts one side of the elastomeric sheet 38. The adhesive-covered induction heating element 18 fixed to the upper surface 20 of base plate 12, which is coated with adhesive layer 36, contacts the opposite side of the elastomeric sheet 38.

Bonding of the base plate 12 and rigid top plate 14 to the elastomeric sheet 38 is achieved by a commercially available induction welding device illustrated schematically at 40 in FIG. 1. The induction welding device 40 is placed at or near the rigid top plate 14 and is operable to produce a magnetic flux which penetrates the top plate 14 and bombards both the upper and lower induction heating elements 16, 18. In response, the induction heating elements 16, 18 are quickly heated to a temperature which melts the layers 32, 36 of adhesive on the base plate 12 and rigid top plate 14, respectively. Once the hot melt adhesive has been melted, the induction welding device 40 is de-activated allowing the adhesive to cool and bond the base plate 12 and rigid top plate 14 to the elastomeric sheet 38. Preferably, the hot melt adhesive has a melt temperature of approximately 240° F. to protect the elastomeric sheeting 38 against overheating.

Figure 2:
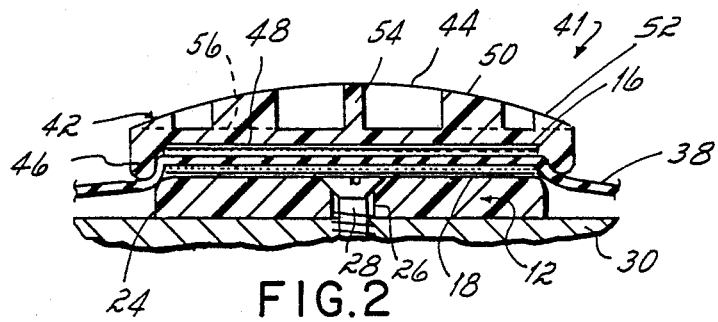
FIG. 2 is a side elevational view in cross section of an alternative embodiment of the fastener shown in FIG. 1, which is shown bonded to the elastomeric sheeting.
Figure 3:
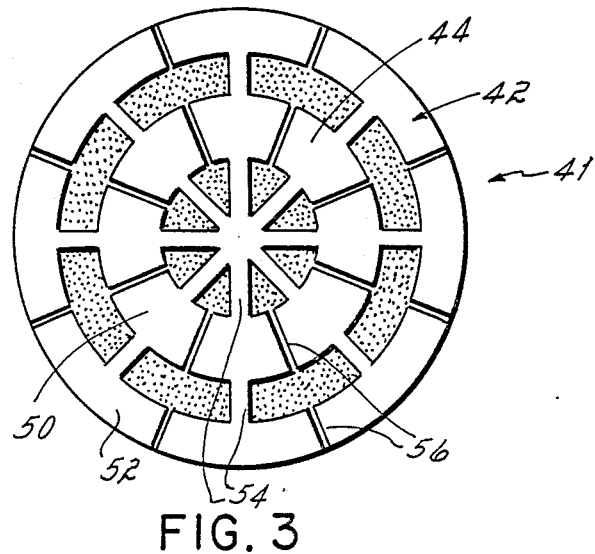
FIG. 3 is a plan view of the fastener shown in FIG. 2.

Referring now to FIGS. 2 and 3, an alternative embodiment of a fastener 41 is illustrated. The same base plate 12 and upper and lower induction heating elements 16, 18 are employed as in fastener 10 described above, but a modified top plate 42 is provided having a ribbed, upper surface 44 and an annular lip 46 which extends outwardly from a surface 48 formed in the top plate 42. As shown in FIG. 3, the configuration of the ribbed upper surface 44 includes two concentric ribs 50, 52 which are connected by a plurality of radially outwardly extending fingers 54, the fingers 54 extending through the center of the plate 42 in a "spot-like" configuration. The ribs 50, 52 are formed with notches, as at 56, to permit drainage of water from the top plate 42.

An upper induction heating element 16 is mounted to the surface 48 of top plate 42 by a mechanical or adhesive connection and then the top plate 42 is forced against the elastomeric sheet 38 so that the annular lip 46 of top plate 42 is concentric to and extends along at least a portion of the edge section 24 of the base plate 12. In the position, the elastomeric sheet 38 is wedged between the annular lip 46 of top plate 42 and the edge section section 24 of base plate 12 to provide additional resistance to the uplift forces produced by wind blowing against the elastomeric sheet 38. Bonding of the top plate 42 and base plate 12 to the elastomeric sheet 38 is accomplished in the identical manner as described above for fastener 10.

While the invention has been described with reference to a preferred embodiment, it will be understood by those skilled in the art that various changes may be made and equivalents may be substituted for elements thereof without departing from the scope of the invention. In addition, many modifications could be made to adapt a particular situation or material to the teachings of the invention without departing from the essential scope thereof. For example, it is contemplated that a number of different adhesives could be employed to affix the elastomeric sheeting to the fastener of this invention. Although hot melt thermoplastic adhesives were discussed above, other types of adhesives are suitable such as butyl-based thermoset adhesives, silicon adhesives and the like.

Therefore, it is intended that the invention not be limited to the particular embodiment disclosed as the best mode contemplated for carrying out this invention, but that the invention will include all embodiments falling within the scope of the appended claims.

What is claimed is:

1. A non-penetrating fastener for securing elastomeric sheeting to a roof, comprising:
    a base plate adapted to be fixedly mounted to the roof;
    a first induction heating element mounted to said base plate, said first induction heating element having at least one surface coated with a hot melt adhesive material;
    a rigid top plate;
    a second induction heating element mounted to said rigid top plate, and second induction heating element having at least one surface coated with a hot melt adhesive material;
    said base plate and said top plate being positionable on opposite sides of and in alignment with one another so that said adhesive coated surface of said first induction heating element mounted to said base plate and said adhesive coated surface of said second induction heating element mounted to said rigid top plate contact to the elastomeric sheeting, said first and second induction heating elements being effective to heat said hot melt adhesive thereon to a molten state in response to bombardment with magnetic flux for bonding the elastomeric sheeting to said base plate and to said rigid top plate
    induction welding means for bombarding said heat induction elements of each of said base plate and said rigid cover plates with magnetic flux to heat said heat inductive elements for melting said hot melt adhesive material.

2. The non-penetrating fastener of claim 1 in which at least one of said induction heating elements is a sheet of metal foil formed of a material chosen from the group of low carbon steel 1008, stainless steel 410 and Metglass alloy 2605-52.

3. The non-penetrating fastener of claim 2 in which said metal foil is about 0.005 inches in thickness.

4. The non-penetrating fastener of claim 1 in which at least one of said induction heating elements is a sheet of metal screen formed of a material chosen from the group of low carbon steel 1008, stainless steel 410 and Metglass alloy 2605-52.

5. The non-penetrating fastener of claim 4 in which said metal screen is a 30 mesh screen with a 0.012 inch wire diameter.

6. The non-penetrating fastener of claim 4 in which said metal screen is a 40 mesh screen with a 0.010 inch wire diameter.

7. The non-penetrating fastener of claim 4 in which said metal screen is an 80 mesh screen with a 0.005 inch wire diameter.

8. A non-penetrating fastener for securing elastomeric sheeting to a roof, comprising:
    a base plate having opposed sides forming an edge section therebetween, one of said opposed sides being coated with an adhesive material;
    means for fixedly mounting said base plate to the roof so that said side coated with adhesive material is exposed;
    a rigid top plate having opposed sides forming an edge section therebeteen, said edge section extending outwardly from at least one of said opposed sides forming a lip, one of said opposed sides being coated with an adhesive material;
    said base plate and said rigid top plate being positioned an opposite sides of the elastomeric sheeting so that said lip of said rigid top plate extends along at least a portion of said edge section of said base plate with the elastomeric sheeting disposed therebetween, and so that said side of each said base plate and said rigid top plate coated with adhesive material contacts and adheres to the elastomeric sheeting wherein said base plate and said rigid top plate are each annular in shape, said lip of said rigid top plate being concentric to said edge section of said base plate when mounted to the elastomeric sheeting.

9. The non-penetrating fastener of claim 8 in which said base plate and said rigid top plate are each annular in shape, said lip of said rigid top plate being concentric to said edge section of said base plate when mounted to the elastomeric sheeting.

* * * * *